April 25, 1961  J. DOLZA  2,981,551
SELF-LEVELING DEVICES FOR VEHICLE SUSPENSIONS
Filed Oct. 30, 1959  7 Sheets-Sheet 2

INVENTOR.
JOHN DOLZA
BY Everett F. Wright
ATTORNEY

April 25, 1961 J. DOLZA 2,981,551
SELF-LEVELING DEVICES FOR VEHICLE SUSPENSIONS
Filed Oct. 30, 1959 7 Sheets-Sheet 3
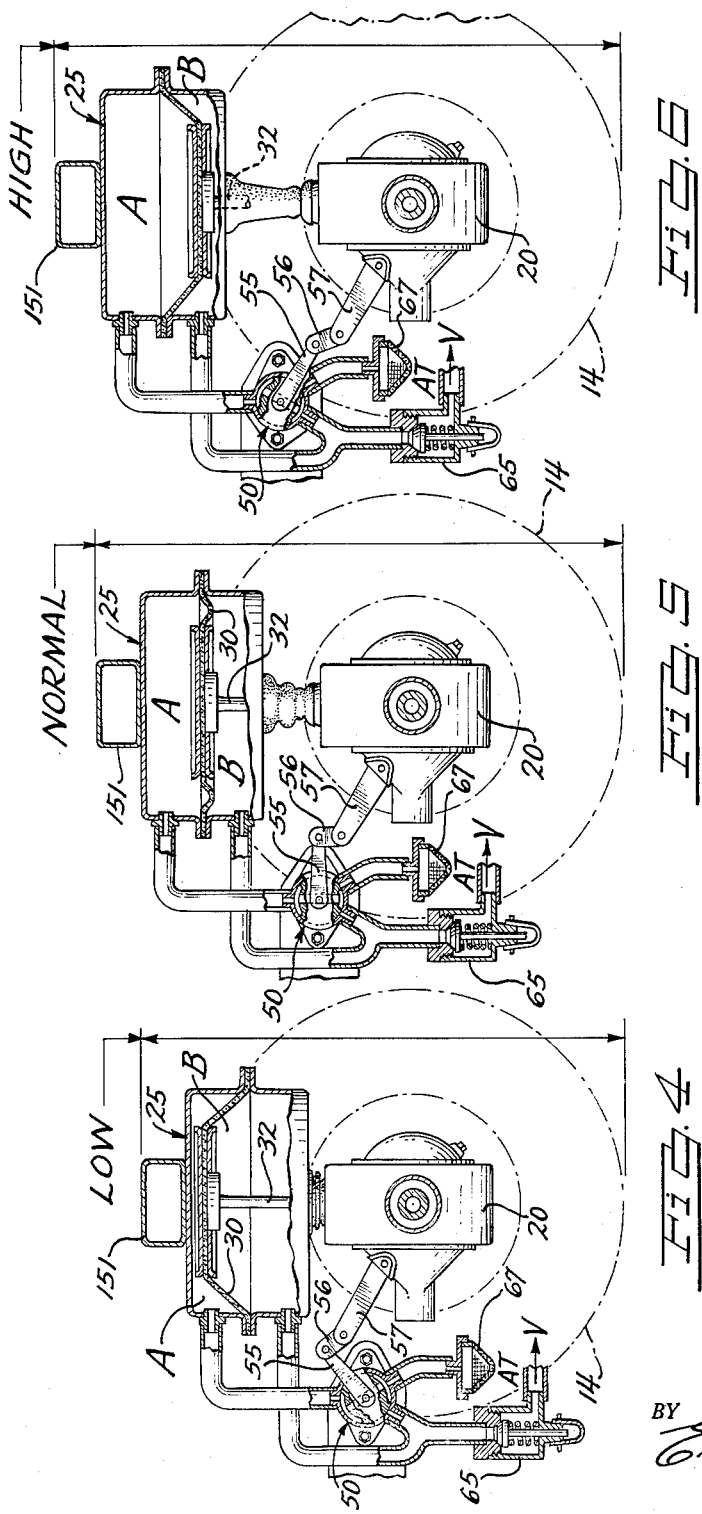
INVENTOR.
JOHN DOLZA
BY
ATTORNEY April 25, 1961   J. DOLZA   2,981,551
SELF-LEVELING DEVICES FOR VEHICLE SUSPENSIONS
Filed Oct. 30, 1959   7 Sheets-Sheet 4

INVENTOR.
JOHN DOLZA
BY
Everett J. Wright
ATTORNEY

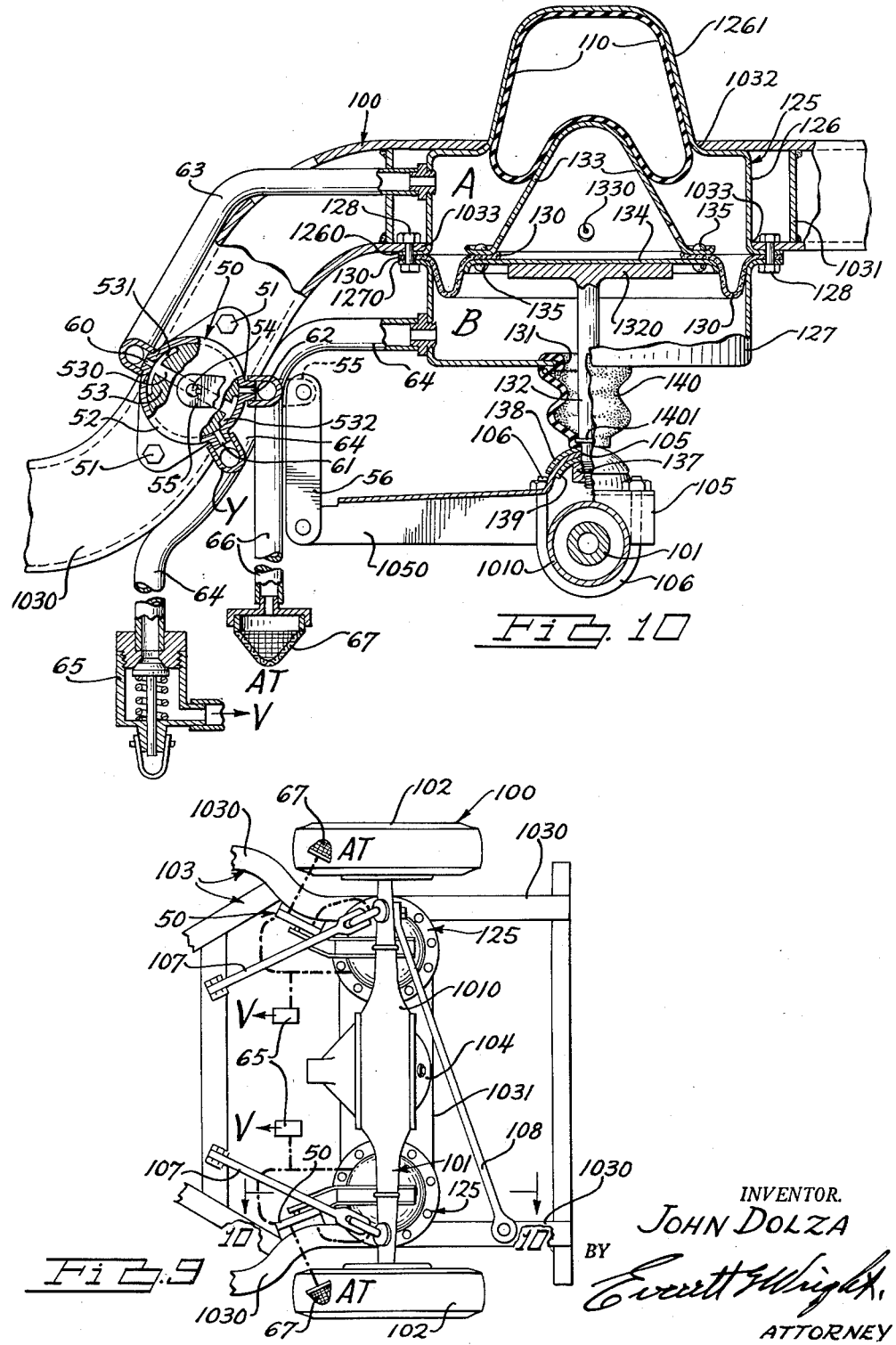

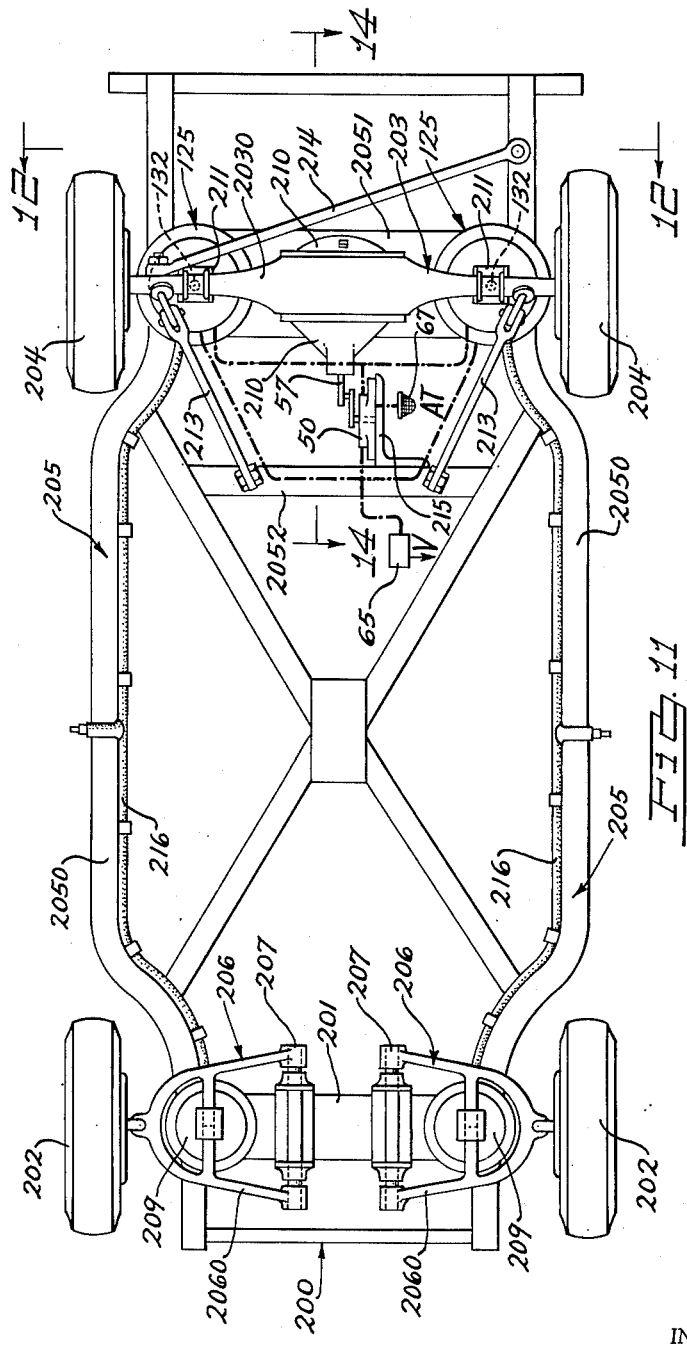

April 25, 1961 J. DOLZA 2,981,551
SELF-LEVELING DEVICES FOR VEHICLE SUSPENSIONS
Filed Oct. 30, 1959 7 Sheets-Sheet 7

INVENTOR.
JOHN DOLZA
BY
ATTORNEY

United States Patent Office 2,981,551
Patented Apr. 25, 1961

2,981,551

SELF-LEVELING DEVICES FOR VEHICLE SUSPENSIONS

John Dolza, 15080 Fenton Road, Fenton, Mich.

Filed Oct. 30, 1959, Ser. No. 849,800

5 Claims. (Cl. 280—124)

This invention relates to motor vehicles of the type wherein the normal or curb height of the sprung mass or frame and body of the vehicle with respect to the unsprung mass or axle and wheels thereof is maintained by a spring or other elastic suspension system, and in particular to improvements in self-leveling means for providing an additional supporting force for the vehicle's spring or other elastic suspension system to balance or compensate for increase in the weight of the sprung mass occurring when the vehicle is loaded, or occurring at the outer wheels when a vehicle is driven around a curve or is turned from a straight course.

The primary object of the invention is to provide in a motor vehicle an inexpensive positive acting self-leveling device consisting of a self-leveling device cylinder and control means therefor adapted to apply additional supporting force to the spring suspension system of a motor vehicle whereby to maintain or substantially maintain the normal curb height of the sprung mass or frame and body of the vehicle with respect to the unsprung mass or axle and wheels thereof when the vehicle is loaded and in use.

A further object of the invention is to provide a self-leveling device for the sprung mass of an internal combustion engine driven vehicle operable responsive to engine intake manifold vacuum or negative air pressure which is applied thereto through novel automatic control means whereby additional supporting force is applied in aid of the conventional vehicle spring suspension usually employed substantially equivalent to additions to the sprung mass occasioned by the loading of a vehicle equipped therewith.

A further object of the invention is to provide a self-leveling device for motor vehicle suspensions capable of compensating for load increases on the sprung mass of the vehicle by automatically introducing and applying an additional supporting force to the normal vehicle spring suspension means substantially equivalent to the said load increase, the said self-leveling device automatically reducing the said applied supporting force when and as the said load increases are diminished or removed.

A further object of the invention is to provide a self-leveling device for motor vehicles in the form of a cylinder having a diaphragm therewithin, one connected to the unsprung portion of the vehicle and the other to the sprung portion of the vehicle at one or more selected locations, and means for applying negative air pressure to said cylinder selectively on opposite sides of said diaphragm responsive to deflection of the sprung portion of the vehicle with respect to the unsprung portion thereof above and below the normal unloaded curb height of the unsprung portion of the vehicle, the said self-leveling device also providing shock absorbing characteristics to the normal spring suspension system of the vehicle.

Another object of the invention is to provide a self-leveling device that utilizes the intake manifold vacuum of an automotive vehicle engine to accomplish automatic self-leveling of the vehicle frame and body with respect to its axles and wheels effective responsive to the deflection of the vehicle spring suspension system when the vehicle is loaded to the extent that the frame and body thereof become lowered below their normal unloaded curb height.

Another object of the invention is to provide, in an internal combustion engine driven vehicle, a self-leveling device of simple and inexpensive construction including a cylinder adapted for use at the lateral center of the vehicle's conventional rear suspension system which accomplishes automatic self-leveling of the sprung mass of the vehicle to its normal unloaded curb height responsive to deflection of the said rear spring suspension system when the vehicle is loaded, the said self-leveling device cylinder being operable through automatic control means by available engine intake manifold vacuum pressures.

Another object of the invention is to provide self-leveling devices for motor vehicles of the type aforementioned which, when applied to the rear axle of the vehicle adjacent each rear wheel, or to the front and rear axles adjacent each of the front and the rear wheels, will also provide anti-roll and shock absorbing characteristics of the normal spring suspension system employed in the vehicle.

Still another object of the invention is to provide a self-leveling device of the aforementioned type for motor vehicles having front and rear air springs, one self-leveling device cylinder being combined with a vehicle air spring adjacent each rear wheel, the front and rear air springs being connected at each side of the vehicle to provide the vehicle with improved self-leveling and air spring functions, and to generally improve the anti-roll and over-all ride characteristics of the vehicle.

Other objects of the invention will become apparent by reference to the following detailed description taken in connection with the accompanying drawings, in which:

Fig. 4 is a sectional view similar to Fig. 3 showing the LOW attitude that may be assumed by the vehicle frame, the position taken by the diaphragm of the self-leveling device cylinder, and the position taken by the control valve thereof, all when the vehicle is loaded before the engine is started and the engine manifold vacuum is not available.

Fig. 5 is a sectional view similar to Fig. 4 showing the NORMAL attitude assumed by the vehicle frame, the normal position taken by the diaphragm of the self-leveling device cylinder, and the position taken by the control valve thereof, all when the vehicle is either (a) unloaded and the engine is not running, or (b) loaded with the engine running and with the engine manifold vacuum available.

Fig. 6 is a sectional view similar to Figs. 4 and 5 showing the HIGH attitude that may be assumed by the vehicle frame, the position taken by the diaphragm of the self-leveling device cylinder, and the position taken by the control valve thereof, all immediately upon the unloading of the vehicle with the engine either running or stopped and with the engine manifold vacuum either available or unavailable, the said position taken by the self-leveling device and control valve being only momentary while permitting the vehicle frame and the self-leveling device cylinder and control valve to return to their normal position shown in Fig. 5.

Figure 7:
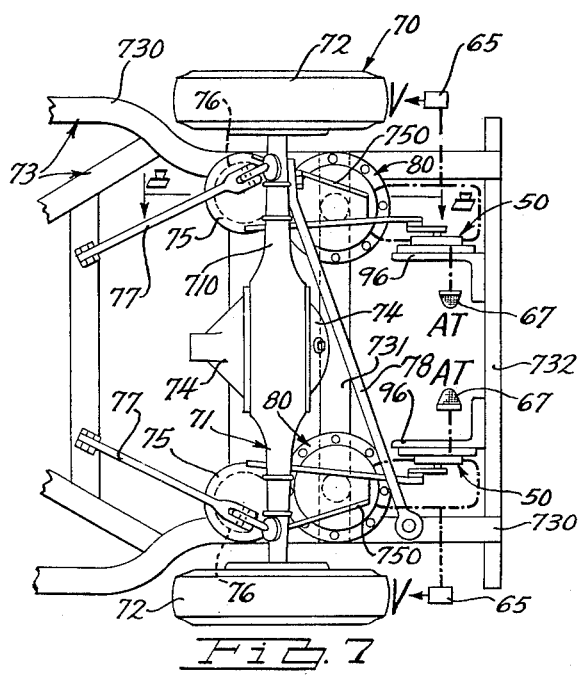

Fig. 7 is a fragmentary bottom view of a motor vehicle chassis employing a coil spring suspension system and incorporating a self-leveling device embodying the invention, a self-leveling device cylinder and control means being disposed adjacent each rear wheel between the rear axle and the vehicle frame.

Figure 8:
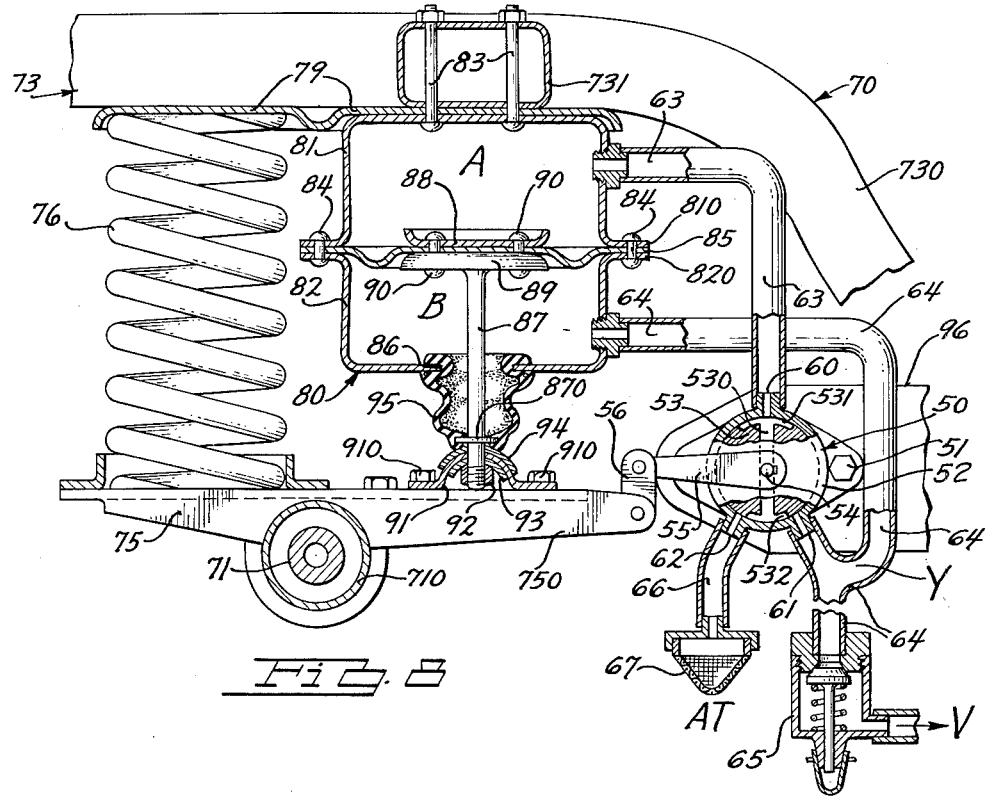

Fig. 8 is an enlarged detailed more or less diagrammatic sectional view taken substantially on the line 8—8 of Fig. 7.

Fig. 9 is a fragmentary bottom view of a motor vehicle chassis employing an air spring suspension system at the rear wheels thereof incorporating a pair of self-leveling devices embodying the invention, each including a self-leveling device cylinder combined with and disposed axially under a rear air spring located adjacent a rear wheel and above the rear axle of the vehicle, and each self-leveling device cylinder having its own control valve means operable independently of the other.

Fig. 10 is an enlarged detailed more or less diagrammatic view taken substantially on the line 10—10 of Fig. 9.

Fig. 11 is a bottom view of a motor vehicle chassis employing an air spring suspension system at all four wheels incorporating a self-leveling device embodying the invention including a self-leveling device cylinder combined with and disposed axially under each of the rear wheel air springs, with the front and rear air springs on each side of the vehicle hermetically interconnected, and with a single self-leveling device control valve disposed laterally centrally of the vehicle controlling both self-leveling device cylinders.

Figure 12:
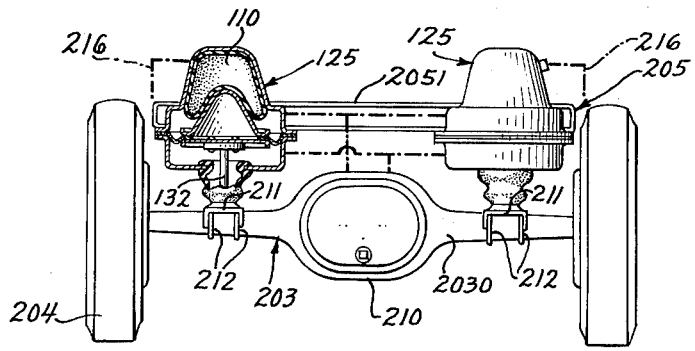

Fig. 12 is a rear elevational view of the construction shown in Fig. 11 taken substantially on the line 12—12 thereof.

Figure 13:
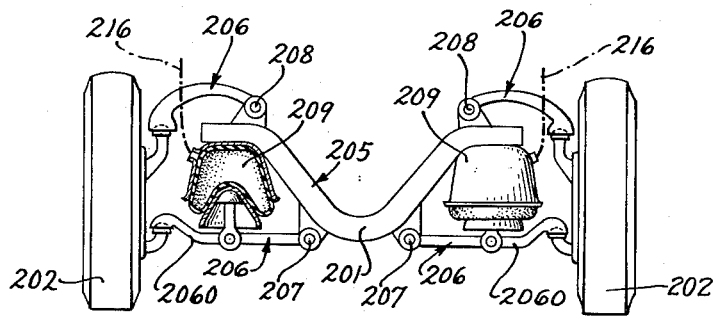

Fig. 13 is a front elevational view of the construction shown in Fig. 11.

Referring now to the drawings wherein like reference numerals refer to like and corresponding parts throughout the several views, the invention is illustrated in Figs. 1-6 inclusive in connection with an internal combustion engine driven motor vehicle 10 consisting of an unsprung mass including front wheels 12, and a rear axle 13 and wheels 14, and a sprung mass including a vehicle frame 15 and a front cross member 11 onto which is generally mounted a body (not shown) which carries the desired loads such as passengers and/or other items. In the particular vehicle 10 shown for illustrative purposes, each front wheel 12 is mounted on axle arms 16 carried by conventional upper and lower wishbone construction 17 pivoted at 18 to the front axle 11. Front coil spring means 19 is interposed between the lower wishbone 17 and the vehicle frame 15. The rear wheels 14 are mounted in conventional driving relationship on the rear axle 13 through a differential incorporated in a differential housing 20 formed as a part of the housing 130 of the rear axle 13. Rear coil spring means 21 is interposed between the rear axle 13 and the vehicle frame 15, and the said rear axle housing 130 is maintained in lateral alignment by the usual struts 22 and a diagonal brace 23. Obviously, other types of spring or elastic suspension may be employed.

Figure 1:
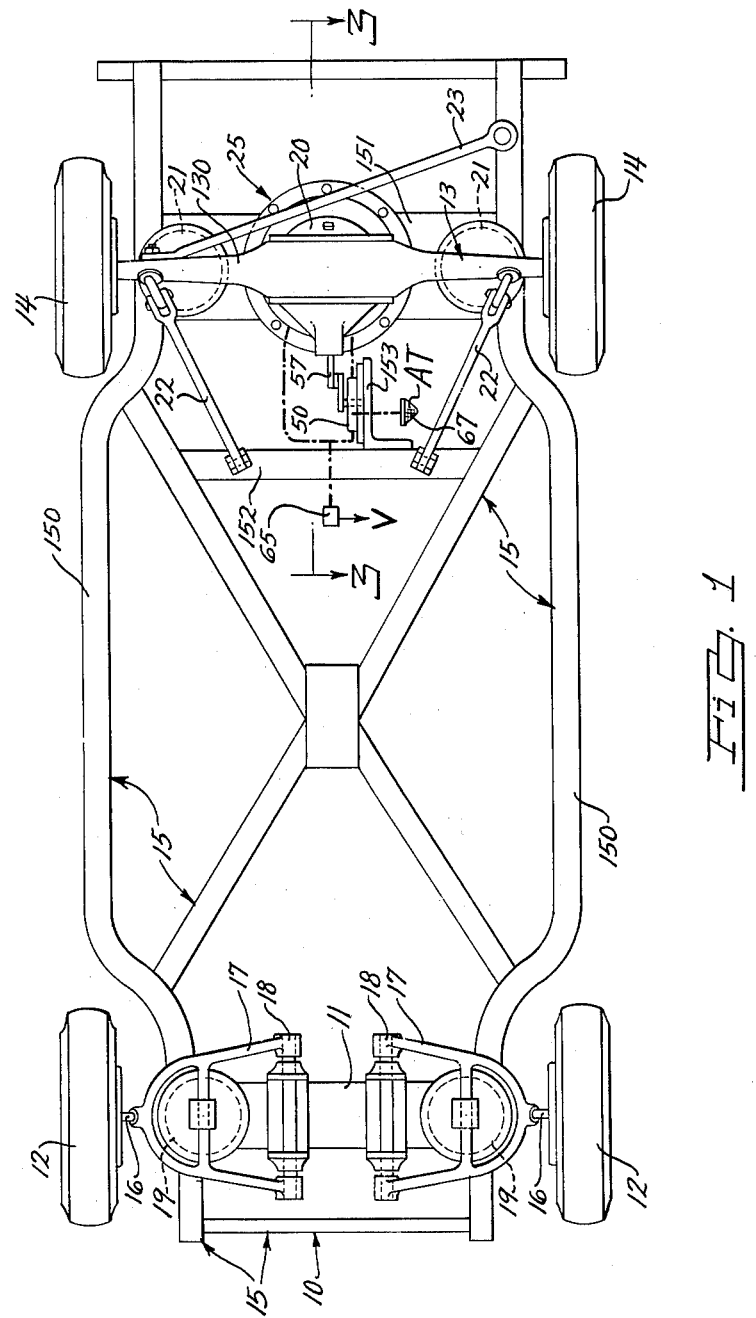
Fig. 1 is a bottom view of a motor vehicle chassis employing a coil spring suspension system and incorporating a self-leveling device illustrative of the invention, the self-leveling device cylinder being disposed between a laterally central rear axle differential housing and the vehicle frame.
Figure 2:
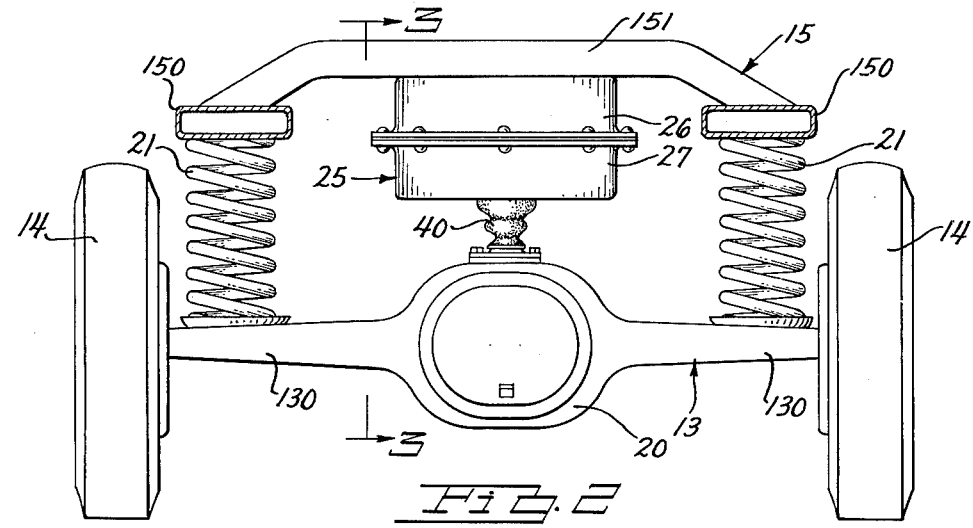
Fig. 2 is a more or less diagrammatic rear elevational view of the construction shown in Fig. 1.
Figure 3:
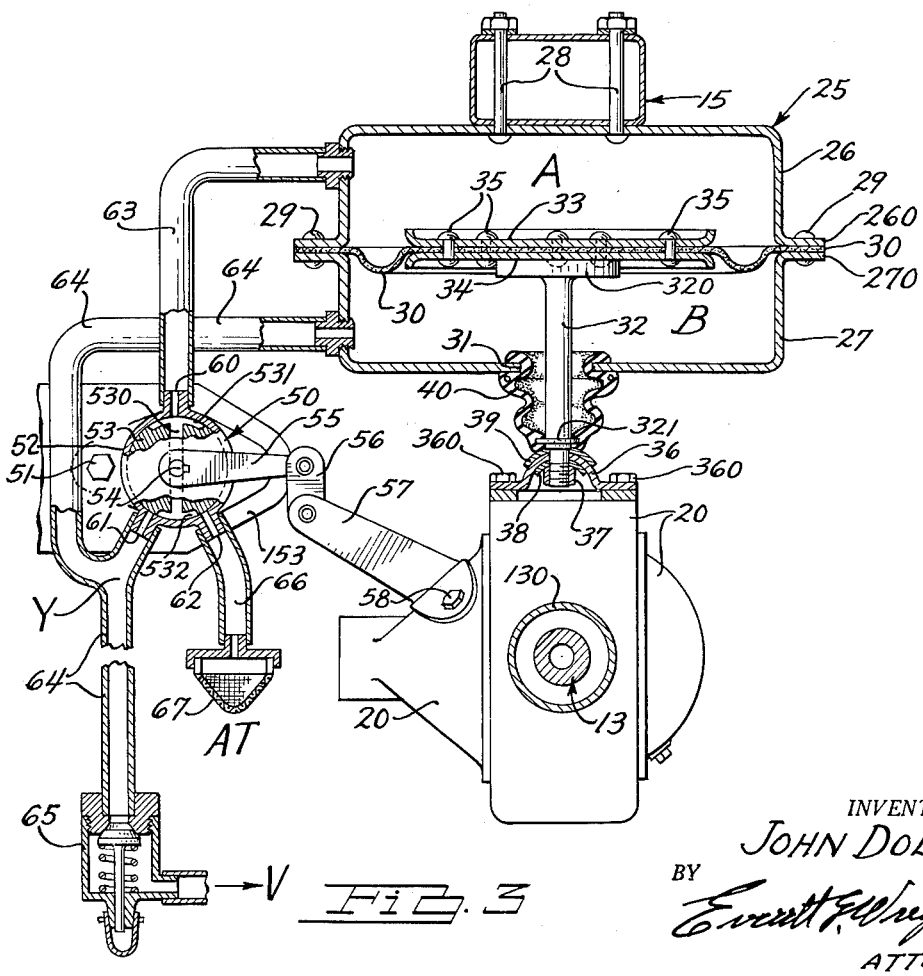
Fig. 3 is an enlarged detailed more or less diagrammatic sectional view taken substantially on the line 3—3 of Figs. 1 and 2.

As illustrated in Figs. 1 and 2, the frame 15 is provided with a cross member 151 extending between the longitudinal frame members 150. A self-leveling device cylinder generally designated by the numeral 25 is interposed between the rear axle differential housing 20 laterally central of the vehicle frame 15 and rear wheels 14. The said self-leveling device cylinder 25 as best shown in Figs. 2 and 3 preferably consists of a two part housing 26—27, the upper housing element 26 being rigidly secured to the bottom of the frame cross member 151 by suitable studs 28 extending upwardly therefrom. The upper and lower housing elements 26 and 27 are horizontally flanged at 260 and 270 respectively and are secured together by such means as rivets 29 with a diaphragm 30 therebetween as best shown in Fig. 3. The bottom of the lower housing element 27 is centrally apertured at 31 to accommodate a connecting rod 32 extending between the diaphragm 30 and the differential housing 20.

The diaphragm 30 of the self-leveling device cylinder 25 has upper and lower grip plates 33 and 34 secured centrally thereto by means of rivets 35. The connecting rod 32 is provided with a top flange 320 which is fixed to the center of the lower grip plate 34 by any suitable means such as welding. An inverted dome-shaped anchorage bracket 36 is fixed by studs 360 to the top of the differential housing 20, and the lower shouldered and threaded end of the connecting rod 32 is secured to the said bracket 36 by a nut 37 and lower and upper arcuate washers 38 and 39. A suitable bellows 40 is preferably disposed in spaced relationship around the connecting rod 32 and is connected at its upper end in sealed relationship to the lower element 27 of the self-leveling device cylinder 25 at the periphery of the aperture 31 in the bottom thereof. The said bellows 40 is secured at its lower end to the connecting rod 32 between a washer 321 welded thereto adjacent the lower shouldered and threaded end thereof and the upper arcuate washer 39 at the top of the said dome-shaped anchorage bracket 36.

A three-way levelizer control valve generally designated by the numeral 50 is mounted by such means as bolts 51 in fixed relationship on a bracket 153 on the cross frame member 152 of the vehicle frame 15. The said three-way levelizer control valve 50 preferably consists of a fixed housing 52 and a turnable selector element 53 keyed on a shaft 54 journaled in the said fixed housing 52 and extending from one side thereof. An operating lever 55 is keyed on the said valve shaft 54 and is connected at its outer end by means of a suitable linkage 56 to a fixed arm 57 secured by studs 58 to the differential housing 20.

The said three-way levelizer control valve 50 has one way 60 connected to the upper chamber A of the self-leveling device cylinder 25 located above the diaphragm 30 thereof, second way 61 connected to a source of negative air pressure or vacuum V and the lower chamber B of the self-leveling device cylinder 25, and a third way 62 connected to atmosphere AT.

For convenience herein, the negative pressure or partial vacuum employed in the operation of self-leveling devices embodying the invention will be termed "vacuum," and the preferable source thereof in an internal combustion engine driven vehicle 10 is the negative pressure or vacuum created in the engine intake manifold when the engine is running. Such a source of vacuum and other sources of vacuum or negative air pressure are well known and need not be illustrated in the drawings.

A suitable conduit 63 connects the way 60 of the three-way levelizer control valve 50 to the upper chamber A of the self-leveling device cylinder 25. The conduit 64 connects a source of vacuum V both to the lower chamber B of the self-leveling device cylinder 25 and to the way 61 of the three-way levelizer control valve 50, a Y being formed in the said conduit 64 to accomplish the dual connection. A spring loaded closed vacuum source valve 65 is interposed in the conduit 64 to maintain the said conduit 64 closed whenever an adequate source of vacuum V is not available, as, for example, if the source of vacuum V is the negative manifold pressure of the engine of the motor vehicle 10, when the said engine is not running. A conduit 66 extends from the way 62 of the three-way levelizer control valve 50 to atmosphere AT. An air filter 67 is suitably mounted on the end of the said conduit 66 open to atmosphere AT.

The three-way levelizer control valve 50 preferably has a passage 530 diametrically through the selector element 53 thereof connecting arcuate valve grooves 531 and 532 formed in the periphery of the said selector element 53. The way 60 and the valve groove 531, and the ways 61 and 62 and the valve groove 532, are so located that the turning of the valve selector element 53 of the levelizer control valve 50 by its operating lever 55 to its NEUTRAL position shown in Fig. 3 will close all of the ways 60, 61 and 62, and no movement of vacuum V is permitted to pass therethrough. When the vehicle frame 15 or sprung mass rises from its NORMAL curb loaded position at which it is normally supported by the vehicle springs 19 and 21, the turnable selector element 53 of the three-way levelizer control valve 50 turns clockwise from its NEUTRAL position as viewed in Fig. 3 whereupon the way 60 becomes connected to the way 61, and the way 62 remains closed. When the vehicle frame 15 or sprung mass lowers from its said NORMAL or curb loaded position, the turnable selector element of the three-way levelizer control valve 50 turns counterclockwise from its NEUTRAL position shown in Fig. 3 whereupon the way 61 is closed, and the way 62 is opened.

Reference is now made to Figs. 4, 5 and 6 for the purpose of explaining the operation of self-levelizing devices embodying the invention when negative engine manifold pressure is employed as a source of vacuum V.

When the vehicle 10 is Unloaded and the engine is not running, or, when the vehicle is Loaded and the engine is running, the sprung mass of the vehicle represented by the frame cross member 151 in Fig. 5 is in its NORMAL position, and the levelizer control valve 50 is in its NEUTRAL or closed position as herebefore described—see Figs. 3 and 5. When the said levelizer control valve 50 is in its NEUTRAL or closed position, the lower chamber B of the levelizer cylinder 25 is also closed by the spring loaded closed vacuum source valve 65, and air in the upper chamber A and in the lower chamber B of the self-leveling device cylinder 25 is substantially at equal pressure.

If, however, the vehicle 10 is Loaded and the engine is not running (vacuum V not available), then the sprung mass of the vehicle represented by the frame cross member 151 in Fig. 4 depresses to a low position between the NORMAL position as shown in Fig. 5 and the LOW position as shown in Fig. 4, and the selector element 53 of the levelizer control valve 50 will move counterclockwise from its position shown in Fig. 5 to its position shown in Fig. 4 which opens the upper chamber A of the self-levelizing device cylinder 25 to atmosphere AT. The lower chamber B of the levelizer cylinder 25 is also closed by the spring loaded vacuum source valve 65. A partial vacuum develops in the said lower chamber B of the levelizer cylinder 25 due to the upward movement of the bellows diaphragm 30 thereof.

When the vehicle 10 is loaded with the sprung mass thereof as represented by the frame cross member 151 depressed as just described, and the vehicle engine is started providing a source of vacuum V sufficient to open the spring loaded closed vacuum source valve 65, the partial vacuum V in the lower chamber B of the levelizer cylinder 25 is increased and the self-leveling device cylinder 25 lifts the sprung mass of the vehicle 10 from its LOW position shown in Fig. 4 to its NORMAL position shown in Fig. 5 whereupon the selector element 53 of the levelizer control valve 50 turns clockwise from its position shown in Fig. 4 to its NEUTRAL position shown in Fig. 5.

If, when the vehicle 10 is loaded and the engine is either running or not running making a sufficient source of vacuum V to operate the self-levelizing device either available or not available, should the sprung mass of the vehicle 10 as represented by the frame cross member 151 rise from its NORMAL position shown in Fig. 5 toward its HIGH position shown in Fig. 6 due to unloading the vehicle, then the selector element 53 of the levelizer control valve 50 will turn clockwise from its NEUTRAL position shown in Fig. 5 toward its position shown in Fig. 6 which interconnects the upper chamber A and the lower chamber B of the levelizer cylinder 25 causing pressures therewithin to become equalized whereupon the sprung mass of the vehicle 10 will return to its NORMAL position and the levelizer control valve 50 will return to NEUTRAL as shown in Fig. 5.

The foregoing processes repeat themselves as the sprung mass of the vehicle 10 is loaded or unloaded in respect to its normal weight and loading, thus maintaining the sprung mass of the vehicle 10 at its normal curb height for which the rear vehicle springs 21 are designed. The normal curb height of a passenger vehicle could be, for example, the height of the sprung mass at the rear axle when the chassis has the vehicle body mounted thereon.

In the embodiment of the invention shown in Figs. 1-6 inclusive, a single self-levelizing device cylinder 25 is employed at the rear of the vehicle 10 located vertically between a laterally central rear axle differential housing 20 and a cross member 151 of the vehicle frame 15. In addition to the levelizing device of the invention performing its primary function of maintaining the sprung mass of the vehicle 10 at the curb height for which the normal vehicle springs are designed, it also constantly acts as a rear shock absorber, both the main and auxiliary functions being accomplished as the vehicle is driven over rough roads. To accomplish the shock absorber function, the way apertures at 60, 61 and 62 are of a suitable size to serve as time delay orifices so that excessive response of the levelizer to rapid vertical motion of the unsprung system while the vehicle is being driven is eliminated. If conventional shock absorbers are provided in the spring suspension system of the vehicle 10, then the self-leveling device of the invention would serve as an auxiliary shock absorber at the rear of the vehicle.

The illustrative embodiment of the invention disclosed in Figs. 7 and 8 is like and similar to the embodiment of the invention disclosed in Figs. 1-6 inclusive except that dual self-leveling devices are employed, one adjacent and rearwardly of each of the rear springs of an internal combustion engine driven motor vehicle 70, the rear portion of which is shown in Fig. 7. The motor vehicle 70 consists of an unsprung mass including a front axle and wheels (not shown), a rear axle 71 and rear wheels 72, and a sprung mass including a vehicle frame 73 into which is generally mounted a body (not shown) which carries desired loads such as passengers and/or other items.

In the particular vehicle 70 shown in Figs. 7 and 8 for illustrative purposes, the front wheel spring suspension may be of any conventional type such as coil springs. The rear wheels 72 are mounted in conventional driving relationship on the rear axle 71 through a differential incorporated in a differential housing 74 formed as a part of a rear axle housing 710. A suitable spring seat 75 is rigidly fixed to the rear axle housing 710 near each end thereof. Each spring spring seat 75 supports a rear vehicle coil spring 76 located adjacent a rear wheel 72, and each spring seat 75 is extended rearwardly at 750 to serve as an anchorage for the connecting rod 87 of a self-leveling device cylinder 80 later described. The rear axle housing 710 is maintained in lateral alignment by such means as the usual struts 77 and a diagonal brace 78.

As illustrated in Figs. 7 and 8, the vehicle frame 73 is provided with a cross frame member 731 extending between longitudinal frame members 730. A self-leveling device cylinder generally designated by the numeral 80 is interposed between the rear axle housing 710 and the cross frame member 731 rearwardly adjacent each rear spring 76. An upper spring retainer plate 79 lies along the bottom of each side frame longitudinal member 730 and under the end of the cross member 731 adjacent thereto, and is formed to be coextensive with the top of a vehicle coil spring 76 and the upper housing element 81 of a self-leveling device cylinder 80. Each self-leveling device cylinder 80 preferably consists of a two-part housing 81 and 82, the upper housing element 81 being rigidly secured to the bottom of the frame cross member 731 by suitable studs 83 extending upwardly therefrom. The upper and lower housing elements 81—82 are horizontally flanged at 810 and 820 respectively and are secured together by such means as rivets 84 with a diaphragm 85 therebetween as best shown in Fig. 8. The bottom of the lower housing element 82 is centrally apertured at 86 to accommodate a connecting rod 87 extending between the diaphragm 85 and the rearwardly extending portion 750 of the spring seat 75.

The diaphragm 85 of each self-leveling device cylinder 80 has upper and lower grip plates 88 and 89 secured centrally thereto by means of rivets 90. The connecting rod 87 is fixed to the center of the lower grip plate 89 by any suitable means such as welding. An inverted dome-shaped anchorage bracket 91 is fixed by studs 910 to the top of the rearwardly extending portion 750 of each spring seat 75, and the lower shouldered and threaded end of the connecting rod 87 of each self-leveling device cylinder 80 is secured to an anchorage bracket 91 by a nut 92 and lower and upper arcuate washers 93 and 94. A suitable bellows 95 is disposed in spaced relationship around each connecting rod 87 connected at its upper end in sealed relationship to the lower element 82 of each self-leveling device cylinder 80 at the periphery of the aperture 86 in the bottom thereof. The said bellows 95 is secured at its lower end to the connecting rod 87 between a washer 870 welded thereto adjacent the lower shouldered and threaded end thereof and the upper arcuate washer 94 at the top of the said inverted dome-shaped anchorage bracket 91 therebelow.

In the embodiment of the invention disclosed in Figs. 7 and 8, a three-way levelizer control valve 50 is fixedly mounted adjacent each self-leveling device cylinder 80 by such means as bolts 51 on a bracket 96 extending forwardly from a rear frame cross member 732 of the vehicle frame 73. Each said three-way levelizer control valve 50 is preferably of the same construction as herebefore described in detail in connection with the embodiment of the invention disclosed in Figs. 1–6 inclusive. The said three-way levelizer control valves 50 of the embodiment of the invention disclosed in Figs. 7 and 8 are each connected to the chambers A and B of a self-leveling device cylinder 80, to a source of vacuum V through a spring loaded closed vacuum source valve 65, and to atmosphere AT through an air filter 67, all in a like and similar manner employed in the embodiment of the invention disclosed in Figs. 1–6 inclusive herebefore described, except that the operating lever 55 of each levelizer control valve 50 as employed in the embodiment of the invention disclosed in Figs. 7 and 8 is connected by a suitable linkage 56 to the rearwardly extending end 750 of a spring seat 75 fixed to the rear axle housing 710.

Since the details of construction of the two levelizer control valves 50 employed in the embodiment of the invention disclosed in Figs. 7 and 8 are precisely the same as the control valve 50 of the embodiment of the invention disclosed in Figs. 1–6 inclusive, corresponding reference numerals have been applied to Figs. 7 and 8 relating to the levelizer control valves 50 of the embodiment of the invention disclosed in Figs. 7 and 8 function the same as the levelizer control valve 50 in the embodiment of the invention disclosed in Figs. 1–6 inclusive.

However, in the embodiment of the invention disclosed in Figs. 7 and 8, inasmuch as a self-leveling device embodying the invention is provided at each rear wheel, each self-leveling device operates independently of the other and performs its leveling function responsive to the load being carried by the rear wheel adjacent to which it is located. Therefore, such an installation as disclosed in Figs. 7 and 8 will function to levelize the sprung mass of the vehicle when subjected to either laterally even or laterally unbalanced loading.

Furthermore, when a vehicle 70 is equipped as in Figs. 7 and 8 with dual self-leveling devices embodying the invention, one at each rear wheel, and the vehicle 70 is driven around turns, an anti-roll couple will be established whenever sufficient vacuum V is available to operate the said self-leveling devices, for example, when the vehicle engine is running. More specifically, the self-leveling mechanism at the outer rear wheel of a turn, where there is a tendency for the sprung mass to depress the rear vehicle spring at the outer side of the turn, will function to lift the sprung weight and act to prevent excessive spring deflection of the said outer vehicle spring thereby aiding in resisting and reducing excessive lateral tilt of the sprung mass during the turning of the vehicle. At the same time, the self-leveling mechanism at the inner rear wheel of the turn, where there is a tendency for the sprung mass to lift upwardly, will function to prevent undue lifting of the sprung mass and also aid in resisting and reducing excessive lateral tilt of the sprung mass during the turning of the vehicle. Additionally, each of the dual self-leveling devices serve as an auxiliary rear shock absorber for the rear spring suspension at one of the rear vehicle wheels.

Figs. 9 and 10 show an alternate embodiment of the invention wherein dual self-leveling devices are employed in unitary combination with air springs, one combined air spring and self-leveling device being employed at each rear wheel of an internal combustion engine driven motor vehicle 100, the rear portion of which is shown in Fig. 9. The motor vehicle 100 consists of an unsprung mass including a front axle and wheels (not shown), a rear axle 101 and rear wheels 102, and a sprung mass including a vehicle frame 103 onto which is generally mounted a body (not shown) which carries desired loads such as passengers and other items.

In the particular vehicle 100 shown in Figs. 9 and 10 for illustrative purposes, the front wheel suspension may be of any conventional type such as coil springs or air springs. The rear wheels 102 are mounted in conventional driving relationship on the rear axle 101 through a differential incorporated in a differential housing 104 formed as a part of a rear axle housing 1010. A suitable domed anchorage member 105 for the connecting rod 132 of a self-leveling device cylinder 125 later described is secured to the rear axle 1010 near each end thereof by such suitable means as the U-bolts 106. The rear axle housing 1010 is maintained in lateral alignment by such means as the usual struts 107 and a diagonal brace 108. The said anchorage members 105 each have a forwardly extending arm 1050 to which the operating lever 55 of a levelizer control valve 50 is linked as later described.

The frame 103 of the vehicle 100 is provided with a cross frame member 1031 extending between longitudinal frame members 1030. The top of the said cross frame member 1031 is preferably apertured at each end thereof at 1032 to accommodate an air spring dome 1261 formed integral with the upper element 126 of a self-leveling device cylinder 125, and the bottom of the said cross frame member 1031 is also apertured at each end thereof at 1033 to accommodate the upper element 126 of the self-leveling device cylinder 125 from which the said air spring dome 1261 extends upwardly as best shown in Fig. 10.

Each self-leveling device cylinder 125 consists of a two-part housing 126—127, the upper housing element 126 including an air spring dome 1261 formed and shaped to receive and retain the upper portion of a sealed air spring 110. The lower portion of the said air spring 110 extends downwardly into the upper housing element 126 of the self-leveling device cylinder 125 with which it is combined. The upper and lower elements 126 and 127 of each self-leveling device cylinder 125 are horizontally flanged at 1260 and 1270 respectively, and are secured together by such means as bolts 128 with a diaphragm 130 therebetween. The same bolts 128 extend through the bottom of the cross frame member 1031 and simultaneously secure the self-leveling device cylinder 125 to the said cross frame member 1031 as shown in Fig. 10. The said diaphragm 130 divides the self-leveling device cylinder 125 into an upper chamber A and a lower chamber B. The bottom of the lower housing element 127 of each self-levelizing device cylinder 125 is centrally apertured at 131 to accommodate a connecting rod 132 extending between and connected to the diaphragm 130 of the self-leveling device cylinder 125 and the dome shaped anchorage member 105 secured to the rear axle housing 1010 therebelow.

The diaphragm of each self-leveling device cylinder 125 has upper and lower grip plates 133 and 134 secured centrally thereto by means of rivets 135. The upper grip plate 133 is frusto-conically domed shown in Fig. 10 to function as a floating air spring pressure member. One or more air bleed apertures 1330 are provided in the side of the said combined upper grip plate and air spring pressure member 133 to maintain a proper air capacity in the chamber A of the self-leveling device cylinder 125.

The connecting rod 132 of each self-leveling device cylinder 125 is provided with a top flange 1320 and is fixed to the center of the lower grip plate 134 of the diaphragm 130 thereof by any suitable means such as welding. The top of the domed anchorage member 105 secured to the rear axle housing 1010 under each self-leveling device cylinder 125 is suitably apertured to receive the threaded portion of the lower threaded and shouldered end of the connecting rod of the self-leveling device cylinder 125 thereabove. The lower threaded and shouldered end of the said connecting rod 132 is securely anchored to the dome of the said anchorage member 105 by means of upper and lower domed washers 138 and 139, and a suitable nut 137. A bellows 140 is disposed in spaced relationship around the connecting rod 132 and is connected at its upper end in sealed relationship to the lower element 127 of the self-leveling device cylinder 125 at the periphery of the aperture 131 in the bottom thereof. The said bellows 140 is secured at its lower end in sealed relationship to the connecting rod 132 between a washer 1401 welded thereto adjacent the lower shouldered and threaded end thereof and the upper domed washer 138 at the top of the domed anchorage member 105.

In the embodiment of the invention disclosed in Figs. 9 and 10, a three-way levelizer control valve 50 is mounted by such means as bolts 51 to the longitudinal frame member 1030 adjacent each self-leveling device cylinder 125. Each three-way control valve 50 is preferably of the same construction as hereinbefore described in detail in connection with the embodiment of the invention disclosed in Figs. 1-6 inclusive. The said three-way levelizer control valves 50 of the embodiment of the invention disclosed in Figs. 9 and 10 are each connected to the chambers A and B of a self-leveling device cylinder 125, to a source of vacuum V through a normally spring loaded closed vacuum source valve 65, and to atmosphere AT through an air filter 67, all in a like and similar manner to that employed in the embodiment of the invention disclosed in Figs. 1-6 inclusive hereinbefore described, except, however, that the operating lever 55 of each levelizer control valve 50 as employed in the embodiment of the invention disclosed in Figs. 9 and 10 is connected by a suitable linkage 56 to the forwardly extending arm 1050 of an anchorage member 105 fixed to the vehicle rear axle housing 1010 adjacent a rear wheel 102.

Since the details of construction of the two levelizer control valves 50 employed in the embodiment of the invention disclosed in Figs. 9 and 10 are precisely the same as the control valve 50 disclosed in the embodiment of the invention disclosed in Figs. 1-6 inclusive, corresponding reference numerals have been applied to Figs. 9 and 10 relating to the levelizer control valves 50 therein. Furthermore, the levelizer control valves 50 of the embodiment of the invention disclosed in Figs. 9 and 10 function in the same manner as the levelizer control valve 50 in the embodiment of the invention disclosed in Figs. 1-6 inclusive.

In the embodiment of the invention disclosed in Figs. 9 and 10, inasmuch as a self-leveling device including a cylinder 125 and a control valve 50 is provided at each rear wheel, each self-leveling device operates independently of the other and performs its leveling function responsive to loads being carried by the rear wheel adjacent to which it it located. Therefore, a dual self-leveling device installation such as disclosed in Figs. 9 and 10 will function to levelize the sprung mass of the vehicle when subjected to either laterally even or laterally unbalanced loading, and will tend to minimize the lateral tilt of a vehicle being driven around turns, and will serve as auxiliary shock absorbing air springs, all providing improved and highly satisfactory vehicle riding qualities under extremes of vehicle loading and other than smooth roads.

Figs. 11, 12 and 13 show another alternate embodiment of a self-leveling device of the invention applied to an internal combustion engine driven vehicle 200 wherein one combined air spring and self-leveling device cylinder is employed at each rear wheel between the rear axle and the vehicle frame, and a conventional air spring is employed at each front wheel between the front wheel wishbone construction and the vehicle frame, the front air spring and the rear air spring at each side of the vehicle being hermetically interconnected, and, wherein a single three-way levelizer control valve is employed at the lateral center of the vehicle adjacent its rear axle to operate both self-leveling device cylinders responsive to the position assumed by the sprung mass at the rear end of the vehicle with respect to the normal curb height thereof when the vehicle is unloaded.

The particular vehicle 200 disclosed in Figs. 11, 12 and 13 for illustrative purposes consists of an unsprung mass including a front wishbone assembly 206 and front wheels 202, a rear axle 203 and rear wheels 204, and a sprung mass including a vehicle frame 205 and front cross member 201 onto which is usually mounted an internal combustion engine and a body (not shown), the engine driving the vehicle in a conventional manner and the body carrying the desired loads such as passengers and/or other items.

In the said vehicle 200, each front wheel 202 is mounted on conventional spindle and wishbone construction generally designated by the numeral 206 pivoted at 207 and 208 to the front cross member 201. Front air springs 209 are interposed between a lower bifurcated arm 2060 of the wishbone construction 206 and the front cross member 201 which extends laterally between side frame members 2050 of the vehicle frame 205. The rear wheels 204 are mounted in driving relationship on the rear axle 203 through a differential incorporated in a differential housing 210 formed as a part of the rear axle housing 2030. A combined air spring and self-leveling device cylinder 125 embodying the invention as hereinbefore described in connection with the embodiment of the invention disclosed in Figs. 9 and 10 is disposed between the rear axle 203 and a cross member 2051 of the vehicle frame 205 adjacent each rear wheel 204.

A suitable anchorage member 211 to which the connecting rod 132 of a self-leveling device cylinder 125 is suitably connected is secured to the rear axle housing 2030 near each end thereof by such means as the U-bolts 212. The rear axle housing 2030 is maintained in lateral alignment by such means as the usual struts 213 and a diagonal brace 214.

The said frame 205 of the vehicle 200 is provided with a cross member 2052 located just forward of the rear axle 203 having a bracket 215 thereon to which a three-way levelizer control valve 50 is fixedly mounted. The said three-way levelizer control valve 50 is preferably of the same construction as disclosed and described in connection with the embodiment of the invention disclosed in Figs. 1–6 inclusive, and has suitable connections to a source of vacuum V through a spring loaded closed vacuum source valve 65, to atmosphere AT, and to the upper chamber A and the lower chamber B of each of the self-leveling device cylinders 125 disposed between the rear axle 203 and the cross member 2051 of the vehicle frame 205 adjacent each rear wheel 204. As in the embodiment of the invention disclosed in Figs. 1–6 inclusive, the operating lever 55 of the said three-way levelizer control valve is suitably linked to a fixed arm 57 preferably extending from the differential housing 210 of the vehicle 200.

The front air spring 209 and the rear air spring 110 of the self-leveling device cylinder 125 at each side of the vehicle 200 are preferably interconnected hermetically by a suitable conduit 216 as indicated in Figs. 11, 12 and 13, whereupon the resistance to the rolling action of the vehicle when being driven on rough roads will be materially improved.

The operation of the self-leveling device of the embodiment of the invention disclosed in Figs. 11, 12 and 13 is like and similar to that of the embodiments of the invention hereinbefore described, except, however, because of the use of a single levelizer control valve 50 at the lateral center of the vehicle 200 for both self-leveling device cylinders 125, together with the interconnection of the front and rear air springs on each side of the vehicle and the incorporation of the rear air springs as an element of a self-leveling device cylinder, a soft well-controlled luxury ride is obtainable in relatively short wheel-base vehicles. Obviously, a levelizer control valve could be employed adjacent each self-leveling device cylinder 125 in a vehicle 200 of the embodiment of the invention disclosed in Figs. 11, 12 and 13, in which event the self-leveling device cylinders 125 would act as described in connection with the embodiment of the invention disclosed in Figs. 9 and 10, but with the added ride advantages derived from hermetically interconnecting the front and rear air springs 209 and 110 on each side of the vehicle 200.

Although the use of self-leveling device cylinders having a diaphragm therein has been indicated as being preferable in practicing the invention, a cylinder employing a conventional piston could be substituted therefor. A rotary type three-way levelizer control valve has been illustrated as being preferable; however, a spool or other type control valve performing the same functions may be substituted therefor.

As explained in detail in connection with the embodiment of the invention disclosed in Figs. 1–6 inclusive, self-leveling devices embodying the invention preferably operate on available engine vacuum V from the intake manifold of the internal combustion engine that drives the vehicle equipped therewith, and no harmful results occur in the functioning of a vehicle's conventional coil or other spring suspension or its conventional air spring suspension, or a combined coil or conventional spring and air spring suspension, when the engine manifold vacuum source V is not available, as, for example, when the engine is not running.

Although but a single embodiment of the invention and several alternate arrangements thereof have been disclosed and described, it is obvious that many changes may be made in the size, shape, arrangement and detail of the various elements of the invention, all without departing from the spirit and scope thereof as defined by the appended claims.

I claim:

1. In a motor vehicle including an internal combustion engine, a source of negative air pressure available when the said engine is running, a sprung mass including a frame, an unsprung mass including pairs of front and rear wheels, and an elastic suspension system means adjacent each vehicle wheel supporting the sprung mass of the vehicle at a predetermined normal height above said unsprung mass thereof when the vehicle is unloaded, a self-leveling device cylinder including a diaphragm therein connected one to the sprung mass and the other to the unsprung mass with the diaphragm disposed substantially central in said cylinder when said sprung mass is supported at its normal height by said suspension means, a first vacuum line connecting said cylinder on one side of the diaphragm thereof to the said negative pressure source, a second vacuum line connecting said cylinder on the other side of the diaphragm thereof to said negative pressure source, three-way valve means fixed to said sprung mass and operatively linked to said unsprung mass interposed in said second vacuum line and having a port to atmosphere, said three-way valve means normally closing said second vacuum line and its port to atmosphere operable responsive to the movement of the sprung mass of the vehicle from its said predetermined height whereby to apply negative pressure to said cylinder on said one side of said diaphragm and opening said cylinder on the other side of said diaphragm and said second vacuum line to atmosphere creating a force between said unsprung and sprung masses restoring the normal height of the vehicle whenever the said sprung mass becomes lowered as when the vehicle is loaded, and a normally spring loaded closed valve means closing off the supply of negative pressure to said first and second vacuum lines openable when said engine is running and said three-way valve means is positioned to apply negative pressure to said cylinder.

2. In a motor vehicle as claimed in claim 1 wherein the self-leveling device cylinder and the valve means are located midway between the rear wheels.

3. In a motor vehicle as claimed in claim 1 wherein two self-leveling device cylinders are employed one adjacent each rear wheel each connected to the source of negative air pressure and each controlled by a three-way valve means located adjacent each rear wheel including a normally spring-loaded closed valve means closing off the supply of negative pressure thereto.

4. In a motor vehicle as claimed in claim 3 wherein the two self-leveling device cylinders employed one adjacent each rear wheel include therein an air spring functioning as that portion of the said elastic suspension system adjacent said rear vehicle wheels.

5. In a motor vehicle as claimed in claim 3 wherein the elastic suspension system consists of air springs adjacent each vehicle wheel, the two rear air springs being included in the two rear self-leveling device cylinders, and means hermetically interconnecting the front and rear air springs on each side of the vehicle.

References Cited in the file of this patent

UNITED STATES PATENTS

| | | |
|---|---|---|
| 598,982 | Egger | Feb. 15, 1898 |
| 1,244,752 | McCrosson | Oct. 30, 1917 |
| 1,641,640 | Myers | Sept. 6, 1927 |
| 2,134,072 | Christensen | Oct. 25, 1938 |
| 2,904,346 | Herbenar | Sept. 15, 1959 |